United States Patent [19]

Michael et al.

[11] Patent Number: 5,548,782
[45] Date of Patent: Aug. 20, 1996

[54] APPARATUS FOR PREVENTING TRANSFERRING OF DATA WITH PERIPHERAL DEVICE FOR PERIOD OF TIME IN RESPONSE TO CONNECTION OR DISCONNECTION OF THE DEVICE WITH THE APPARATUS

[75] Inventors: Martin S. Michael, Los Gatos; Frederick K. Leung, Cupertino, both of Calif.

[73] Assignee: National Semiconductor Corporation, Santa Clara, Calif.

[21] Appl. No.: 58,397

[22] Filed: May 7, 1993

[51] Int. Cl.$^6$ ................................................. G06F 15/02
[52] U.S. Cl. ........................ 395/835; 395/828; 395/500; 364/221.7; 364/230.2; 364/264.1; 364/DIG. 1
[58] Field of Search ................................. 395/275, 500, 395/700, 725, 822, 828, 835, 839

[56] References Cited

U.S. PATENT DOCUMENTS

| | | | |
|---|---|---|---|
| 4,964,124 | 10/1990 | Burnett | 371/15.1 |
| 4,972,470 | 11/1990 | Farago | 380/52 |
| 5,210,855 | 5/1993 | Bartol | 395/500 |
| 5,287,531 | 2/1994 | Rogers, Jr. et al. | 395/800 |
| 5,317,693 | 5/1994 | Cuenod et al. | 395/829 |
| 5,335,329 | 8/1994 | Cox et al. | 395/282 |
| 5,379,382 | 1/1995 | Work et al. | 395/883 |
| 5,386,567 | 1/1995 | Lien et al. | 395/700 |
| 5,428,748 | 6/1995 | Davidson et al. | 395/829 |

FOREIGN PATENT DOCUMENTS

| | | |
|---|---|---|
| A-0351961A2 | 1/1990 | European Pat. Off. . |
| A-0490373A1 | 6/1992 | European Pat. Off. . |
| A-0552873A1 | 7/1993 | European Pat. Off. . |

OTHER PUBLICATIONS

IBM Technical Disclosure Bulletin, "Circuits to Allow Cartridge Hot-Plugging", vol. 29, No. 7, Dec. 1986, New York, US, pp. 2877–2878.
IBM Technical Disclosure Bulletin, "Control Circuit for Hot Plugging a ROS Catridge", vol. 29, No. 3, Aug. 1986, New York, US, pp. 1060–1062.

*Primary Examiner*—Thomas C. Lee
*Assistant Examiner*—Moustafa Mohamed Meky
*Attorney, Agent, or Firm*—Limbach & Limbach L.L.P.

[57] ABSTRACT

A computer system includes a peripheral device connector interface that automatically identifies the type of peripheral device, if any, coupled to the interface and configures itself for handling data flows to and from peripheral devices of the identified type. The system includes a connector that receives a number of peripheral identification signals that are generated by a peripheral device attached to the connector. Peripheral device data signals, which are also received at the connector, are routed by a connector interface. A number of interface circuits are provided to control the different types of peripheral devices that may be attached to the connector. The interface circuits are coupled to configuration registers that provide operational information for the interface circuits. A transition detector identifies any change in the peripheral identification signals. Any change in the peripheral identification signals corresponds to a change in the peripheral device attached to the connector. In response to a changed peripheral device, an interface disable generator applies a disable signal to the connector interface. A signal decoder is then used to decode the peripheral identification signals so as to identify the peripheral attached to the connector. After the peripheral is identified, configuration data for the peripheral is loaded into the configuration registers.

14 Claims, 3 Drawing Sheets

APPARATUS FOR PREVENTING TRANSFERRING OF DATA WITH PERIPHERAL DEVICE FOR PERIOD OF TIME IN RESPONSE TO CONNECTION OR DISCONNECTION OF THE DEVICE WITH THE APPARATUS

BRIEF DESCRIPTION OF THE INVENTION

This invention relates generally to the connection between a computer and a peripheral device. This invention more particularly relates to an apparatus and method for recognizing a peripheral device from a cable connection and for automatically configuring the recognized peripheral device.

BACKGROUND OF THE INVENTION

Some computers include a single peripheral port used for connection to an external peripheral device. The peripheral port is generally in the form of a female connector positioned on the backplane of the computer. The computer is interconnected with a peripheral device through a cable that includes a male connector including a number of connector pins. The female connector includes a corresponding number of pin receptacles.

Traditionally, peripheral ports have had dedicated functions. For example, many early computers included a peripheral port that was dedicated for parallel (a parallel port) connection to another device, such as a printer. Recently, computer makers have provided a dual-function peripheral port that affords the capability to use a single port for two different peripheral devices. For example, recent computers have used a dual-function peripheral port to serve as an external floppy disk drive port and as a parallel port. The necessity for dual function peripheral ports is largely driven by the expanding portable computer market. The small size of portable computers reduces the amount of space for peripheral ports. Therefore, disparate peripheral devices should be attachable to a single port with minimal user intervention.

Dual-function peripheral ports used in the past rely upon an external peripheral selection switch to designate whether the port is being used as a parallel port or as an external floppy disk drive port. When the computer is turned on or reset, the setting of the switch is sensed and then used by the central processing unit (CPU) of the computer to load the appropriate peripheral device driver program.

The external peripheral selection switch used in the aforementioned prior art devices is inconvenient to use: the computer operator must remember to set the switch, the switch may be jostled from its original position, and the computer must be re-booted each time the switch setting is changed. The switch also presents design constraints as the switch should be positioned in a location that is convenient for the user. Finally, external peripheral selection switches are relatively expensive to install.

For the foregoing reasons, it would be advantageous to eliminate the requirement of an external peripheral selection switch. It would also be advantageous to expand the utility of a dual-function peripheral port to a multi-functional peripheral port.

Multiple peripheral devices could conceivably be used at a single peripheral port if the peripheral device was identifiable. Of course, a multi-way external switch could be used to identify the connected peripheral device. However, the problems with such an external switch were described above.

One possible technique for eliminating the external configuration switch is to use cable pins to identify the peripheral device. In other words, two or more cable pins could be dedicated to conveying peripheral identification signals generated by a peripheral device. The host device would sense the peripheral identification signals and then would load the appropriate peripheral device driver program.

There are several problems associated with this approach. First, a decoding mechanism must be provided to identify the pin signals for the peripheral devices. Next, the decoding mechanism must accommodate the phenomenon that the pin signals from the peripheral devices will initially arrive at different times due to the mechanics of connecting a cable. Specifically, when a cable is physically connected to a port, some pins of the cable are likely to be inserted into the connector before others. This time difference, small by human standards, may be very large in a computer environment. Thus, a mechanism must be provided to account for connection delays, to insure that the proper peripheral identification signal is read.

OBJECTS AND SUMMARY OF THE INVENTION

It is a general object of the invention to provide a method and apparatus for automatically recognizing and configuring a cable-connected peripheral device.

It is another object of the invention to provide a multi-function peripheral port.

It is a related object of the invention to provide a multi-function peripheral port that eliminates the need for an external peripheral selection switch.

It is another object of the invention to provide a multi-function peripheral port that will recognize a connection to a new peripheral device without the need for rebooting the host computer.

These and other objects are achieved by an apparatus and method for automatically recognizing and configuring a peripheral device. The apparatus includes a connector that receives two or more peripheral identification signals, which are generated by the peripheral device's connector or by the peripheral device attached to the connector. Peripheral device data signals, which are also received at the connector, are routed by a connector interface. A number of interface circuits are provided to control the different types of peripheral devices that may be attached to the connector. The interface circuits are coupled to configuration registers that provide operational information for the interface circuits. A transition detector identifies any change in the peripheral identification signals.

Any change in the peripheral identification signals corresponds to a change in the peripheral device attached to the connector. Typically, after one peripheral device is disconnected, the peripheral identification signals will indicate that no device is connected to the connector interface. Then, when another peripheral device is connected to the connector interface, a corresponding set of peripheral identification signals will be received.

In response to a change in the peripheral identification signals, an interface disable generator disables the connector interface. A signal decoder is then used to decode the peripheral identification signals so as to identify the peripheral attached to the connector. After the peripheral is identified, configuration data for the host and peripheral interface is loaded into the configuration registers and corresponding driver software is loaded by the host computer. Thereafter, normal operation between the host computer and the peripheral device can commence. With the present invention, a powered peripheral may be attached to a powered host computer.

BRIEF DESCRIPTION OF THE DRAWINGS

For a better understanding of the nature and objects of the invention, reference should be made to the following detailed description taken in conjunction with the accompanying drawings, in which.

Like reference numerals refer to corresponding parts throughout the several views of the drawings.

DETAILED DESCRIPTION OF THE INVENTION

Figure 1:
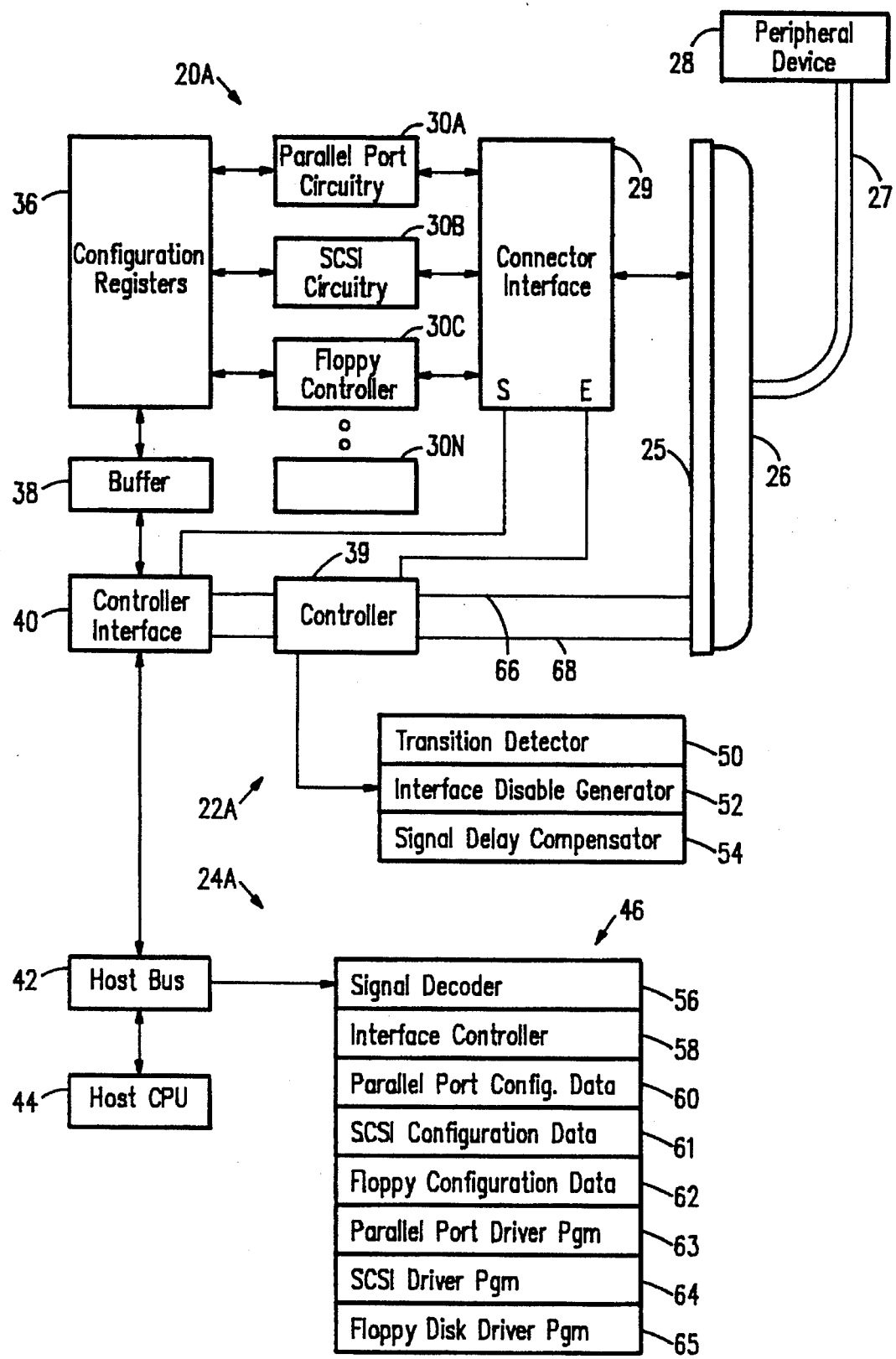
FIG. 1 is an apparatus for automatic configuration of a cable-connected peripheral device.

Referring to FIG. 1, an apparatus 20A for automatic recognition and configuration of a cable-connected peripheral device is disclosed. The apparatus 20A includes a peripheral controller 22A which, for the sake of illustration, is depicted as being connected to a separate host computer 24A. In actuality, the peripheral controller 22A would typically be in the form of a card positioned within the host computer 24A. In the alternative, the peripheral controller 22A may form a portion of the input/output section of the host computer 24A.

The peripheral controller 22A includes a connector 25 that receives a cable 26, 27 coupled to an external peripheral device 28. The connector 25 would typically be a female connector positioned on the backplane of the host computer 24A.

The Connector 25 is coupled to a connector interface 29, which may be a multiplexer. The connector interface 29 is coupled to a number of interface circuits 30 that support the different types of peripherals that may be attached to the connector 25. By way of example, FIG. 1 depicts parallel port circuitry 30A, Small Computer System Interface (SCSI) circuitry 30B, and a floppy disk drive controller 30C. Other configurations for the interface circuits 30 are possible. For instance, parallel port circuitry 30A and the SCSI circuitry 30B may be combined into a single port or another type of peripheral port may be provided, if desired.

Configuration registers 36 are provided to store configuration information that is accessed by the interface circuits 30. As known by those skilled in the art, configuration registers 36 store information concerning a predefined set of system functions, such as pin functionality, power down information, and the I/O addresses of functions. Prior to the operation of a given peripheral device, the corresponding peripheral device interface circuit 30 accesses the configuration registers 36 to obtain the appropriate information regarding the system and peripheral functions.

Configuration registers 36 are commonly loaded through a buffer 38 that may be used in accordance with the invention. The buffer 38 is connected to a controller interface 40 that provides a link to the system bus 42 of the host computer 24A. Connector 25 is coupled to two data lines 66, 68. A controller 39 is positioned between the connector 25 and the controller interface 40. As will be more fully described below, the controller 39 includes logic constituting a transition detector 50, an interface disable generator 52, and a signal delay compensater 54.

A host CPU 44 coordinates the operation of the host computer 24A. The host CPU 44 is coupled to a memory module 46 that may be any combination of RAM, ROM, or disk memory. The memory module 46 stores a number of programs that coordinate the automatic recognition and configuration of a cable-connected peripheral device. These programs include: a signal decoder 56, and an interface controller 58. Also stored in the memory module 46 is parallel port configuration data 60, SCSI configuration data 61, and floppy controller configuration data 62, as well as a parallel port driver program 63, a SCSI driver program 64 and a floppy disk driver program 65.

Having provided a description of the elements comprising the automatic configuration apparatus of the invention, attention presently turns to the operation of those elements. In the described embodiment of the invention, connector 25 includes two pins for peripheral identification. These pins are coupled to conductors 66 and 68. The conductors 66 and 68 respectively convey first and second digital peripheral identification signals from the connector 25 to the controller 39.

As implied by the name, the peripheral identification signals identify the type of peripheral connected to connector 25. By way of example, the following decoding scheme may be used:

TABLE I

| First Peripheral Identification Signal | Second Peripheral Identification Signal | Peripheral |
|---|---|---|
| 0 | 0 | Parallel Port |
| 0 | 1 | Floppy |
| 1 | 0 | SCSI |
| 1 | 1 | No Device |

Thus, for instance, if the first peripheral identification signal (sometimes referred to herein as PIS_1) is low ("0") and the second peripheral identification signal (sometimes referred to herein as PIS_2) is high ("1"), then the connector 25 is coupled to a floppy disk drive. In the alternative, if both the first peripheral identification signal and the second peripheral identification signal are high, then no device is coupled to the connector 25. In this case, the connector interface 29 should be disabled, in which case all the connector pins of the connector interface other than the device identifying pins are set to "tristate" (put into a high impedance state).

The transition detector 50 is initially utilized to determine whether there has been a transition in the status of the peripheral identification signals. The following pseudocode may be used to implement the logic of the transition detector:

| While ON do | (1) |
| begin | (2) |
| Transition = False | (3) |
| If PIS_1 ≠ Prior_1 | (4) |
| then Transition = True | (5) |

| | |
|---|---|
| Else if PIS_2 ≠ Prior_2 | (6) |
| then Transition = True | (7) |
| Prior_1 = PIS_1 | (8) |
| Prior_2 = PIS_2 | (9) |
| If Transition then CALL IDG | (10) |
| end | (11) |

Lines (1), (2), and (11) of the pseudocode establish a loop which is active as long as the host computer 24A is "ON". Line (3) is for the initialization of the boolean variable "transition". Lines (4) through (7) test for a transition in signal values by comparing the present signal values to the preceding signal values. Specifically, the first peripheral interface signal (PIS_1) is compared to a preceding first peripheral interface signal (Prior_1). If the values are not equivalent, then a transition in the signal has occurred and the "transition" variable is set to true.

Lines (8) and (9) copy the present peripheral interface signals (PIS_1, PIS_2) into variable (Prior_1, Prior_2) representing the prior peripheral identification signal values, which will be compared to new peripheral interface signals on the next iteration of the loop.

If the boolean variable "transition" is set to "true", then the controller 39 calls its "IDG" program, the interface disable generator 52. The interface disable generator 52 generates an appropriate command that temporarily disables connector interface 29. In particular, a control signal is generated so that the enable pin "E" of the connector interface receives a "low" signal that prevents the connector interface from transmitting data to or from the connector 25. This prevents data received from over the connector interface 29 from being erroneously processed by an interface circuit 30 with the wrong configuration data and drivers. For example, corrupted data would result if the SCSI configuration and driver were still loaded and in use immediately after a floppy disk drive was coupled to the connector 25. In that case, the floppy disk drive data would be treated as if it were SCSI data. The immediate disabling of the controller interface 29 is also important because it insures that inappropriate power levels are not applied to the newly connected peripheral.

A signal delay compensator 54 may also be provided to augment the action of the interface disable generator 52. That is, the signal delay compensator 54 continues to provide a "low" signal to the enable pin "E" of the connector interface, so as to disable the receipt of new connector data until stable (and thus valid) peripheral identification signals are received. The signal delay compensator 54 is required because the positioning of a male connector in connector 25 will result in some pins from the male connector entering the connector 25 before other pins. Thus, the pins corresponding to conductors 66 and 68 may enter the connector at different times. The signal delay compensator 54 accounts for this phenomenon by disabling the connector interface 29. The signal delay compensator 54 also preferably provides a disabling signal to connector interface 29 for a period of time sufficient to decode the peripheral device, to download the relevant configuration data, and to load the corresponding driver software for use by the host computer, as will be discussed below. In most cases, 0.5 to 2 seconds of additional delay will be appropriate for this purpose.

The logic of the transition detector 50 may be implemented in a low cost microcontroller or state machine. The interface disable generator 52 merely requires the generation of an appropriate signal to be applied to the connector interface 29.

The remaining processing steps of the invention may be executed by the host computer 24A. In particular, by using controller interface 40, host bus 42, memory 46 and host CPU 44, a number of remaining functions can be performed on the host computer 24A which will generate control signals for execution by the peripheral controller 22A. For example, after the peripheral interface signals have had an opportunity to settle, they are decoded by signal decoder 56, running on the host computer 24A. Based upon Table I defined above, the signal decoder 56 may be executed in pseudocode as follows:

| | |
|---|---|
| If (PIS_1=0) and (PIS_2=0) | (12) |
| then peripheral=Parallel_Port | (13) |
| If (PIS_1=0) and (PIS_2=1) | (14) |
| then peripheral=Floppy_Controller | (15) |
| If (PIS_1=1) and (PIS_2=0) | (16) |
| then peripheral=SCSI | (17) |
| If (PIS_1=1) and (PIS_2=1) | (18) |
| then peripheral=No Device | (19) |

Line 12 tests for the condition for a parallel port, as defined in Table I. If the condition is satisfied, then line 13 assigns the "peripheral" variable to "parallel_port". The remaining code tests for the other peripheral options. Note that line 18 identifies a condition in which no peripheral is attached to connector 25. In this case, the connector interface is preferably disabled, as previously described.

The identity of the peripheral is used by the interface controller 58 to send appropriate control signals to connector interface 29. After a peripheral is identified, the operation of an interface controller 58 is known in the art.

The identity of the peripheral is also used to download the appropriate configuration data. Namely, parallel port configuration data 60, SCSI configuration data 61, and floppy configuration data 62 are stored in memory module 46. Once the appropriate peripheral is identified, the corresponding configuration data is downloaded through buffer 38 into the configuration registers 36. From the configuration registers 36, the configuration data may be accessed by the appropriate interface circuit 30.

Figure 2:
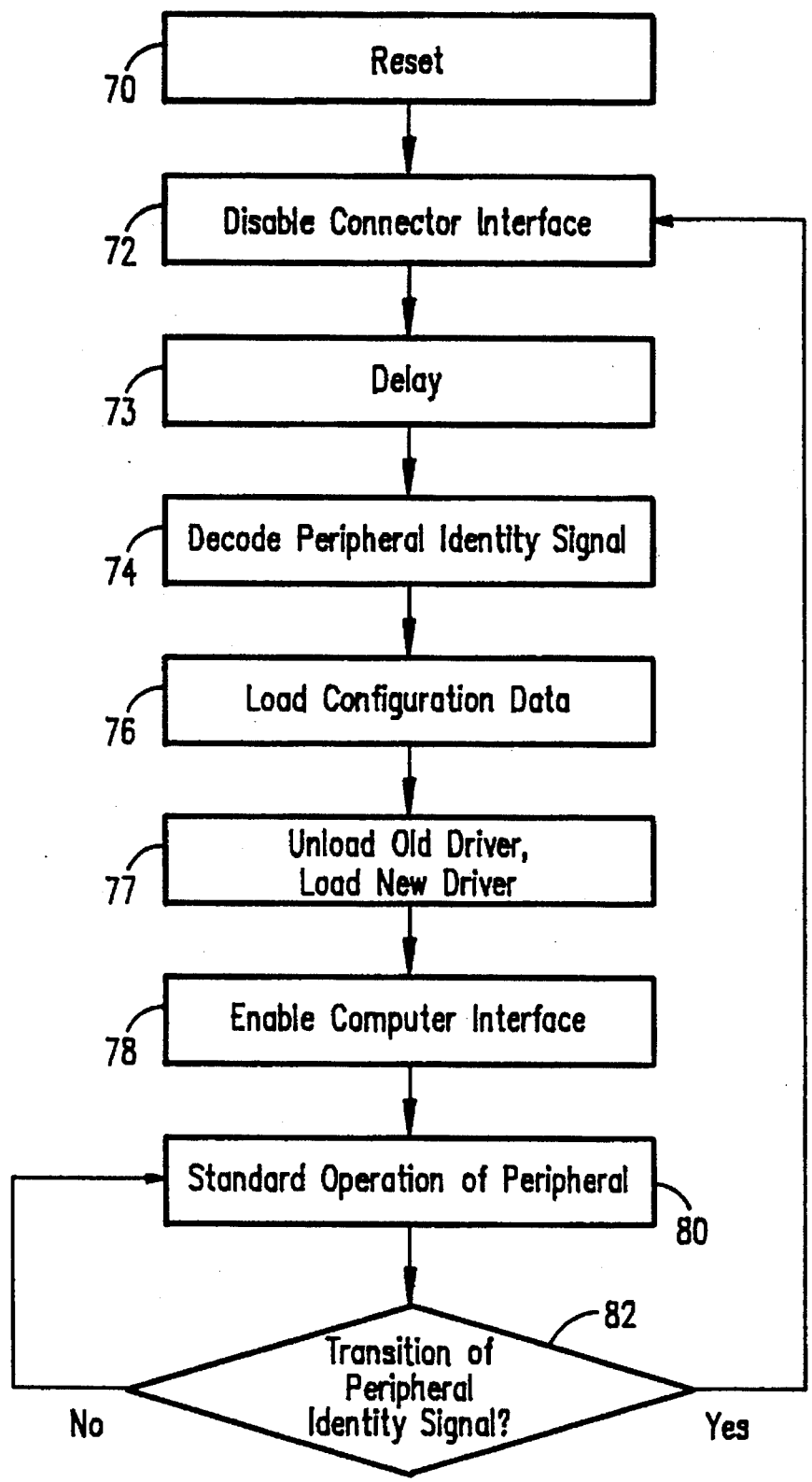
FIG. 2 depicts a method for automatic configuration of a cable-connected peripheral device.

FIG. 2 provides a flow-chart representation of the methodology of the invention as described in relation to FIG. 1. The first step depicted in the figure is a "reset" step (block 70). This step is equivalent to turning the host computer "ON". The reset step (block 70) is followed by a disable connector interface step (block 72). This step activates the interface disable generator 52. When restarting the host computer 24A, it is preferable to immediately disable the connector interface 29 for a predetermined period of time (approximately 200 milliseconds). This allows peripheral identification signals to be generated by a peripheral and to be applied through connector 25.

A delay step (block 73) is then provided. As discussed above, the purpose of the delay is to allow the peripheral identification signals to settle. The peripheral identification signals are then decoded by signal decoder 56 (block 74). In response to the identification of the peripheral during the decoding step (block 74), the appropriate configuration data (say, SCSI configuration data 61) is loaded through the host bus 42, through the controller interface 40, through buffer 38, and into configuration registers 36 (block 76). After the configuration data is loaded, the host computer 24 unloads the previous software driver program and loads the new driver program corresponding to the newly attached peripheral (step 77).

The next step associated with the method of FIG. 2 is to enable the connector interface (block 78). As previously discussed, this enabling feature may be initiated by the deactivation of the signal delay compensator 54.

At this juncture, the appropriate configuration data may be accessed in the configuration registers 36 by the appropriate interface circuit. This will result in standard operation of the peripheral device (block 80). During the "ON" state of the host computer 24A, the transition detector 50 will be active to identify whether there has been a transition on connector 25. If no transition is identified, then standard operation continues (block 80), otherwise, the interface connector is disabled (block 72), and the processing of FIG. 2 is repeated.

Figure 3:
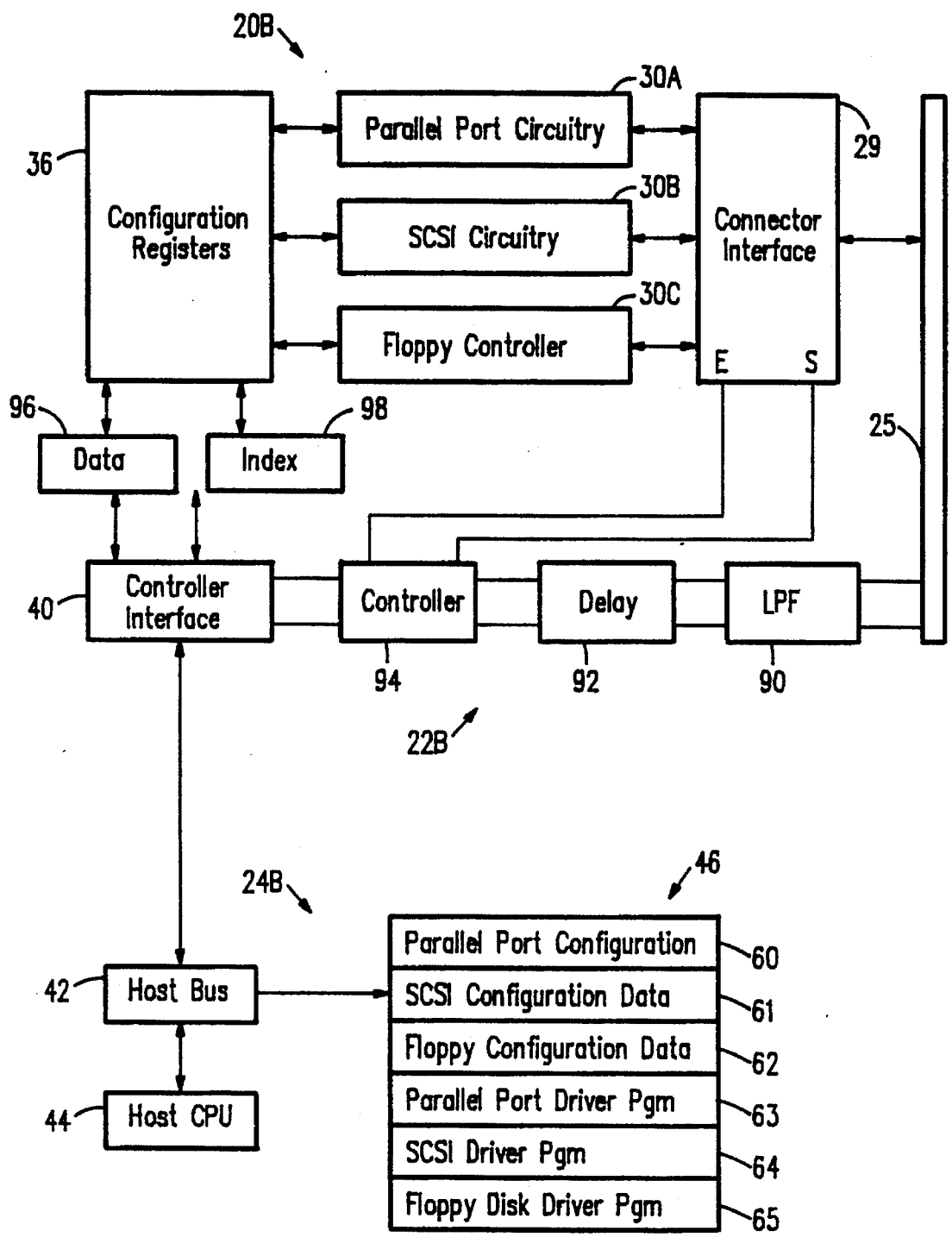
FIG. 3 is an alternate embodiment of an apparatus for automatic configuration of a cable-connected peripheral device.

Turning now to FIG. 3, an alternate embodiment of an apparatus 20B for automatically recognizing and configuring a peripheral is disclosed. In this embodiment, the signal transition detection, interface disabling, signal delay compensation, and signal decode are all executed on the peripheral controller 22B. In particular, the peripheral identification signals are decoded at a controller 94. The controller 94 may be a low cost commercially available microcontroller, or state machine. The controller 94 generates an appropriate interface disable signal, which is applied to port "E" of the connector interface 29. The controller 94 also controls the connection interface 29 peripheral signal selection through port "S".

In this embodiment, signal delay compensation is handled through hardware elements. In particular, a standard low pass filter 90 is provided to filter high frequency "glitches" that may be produced when a new connection is made at connector 25. The peripheral identification signals are conveyed from the low pass filter 90 to a delay element 92, which may be a standard RC circuit with a time constant of approximately 50 milliseconds. The detained output from the delay element 92 is then applied to the controller 94. While the controller 94 is used to decode the peripheral identification signals in this embodiment, this decoded data must be transferred to the host CPU 44 so that the appropriate configuration data may be loaded from memory module 46. The controller 94 provides an appropriate disable signal to the connector interface 29 for a sufficient time to allow the appropriate configuration data to be loaded into the configuration registers. The host CPU 44 may command the controller 94 to enable the connector interface 29 after the configuration data is loaded.

The apparatus of FIG. 3 includes a data register 96 and an index register 98, which are used to read and write to the configuration registers 36. The index register 98 can point to each configuration register. The data at the location indicated by the index register is transferred to the configuration registers 36 through the data register 96. Thus, a method and apparatus for automatically recognizing and configuring a cable-connected peripheral device has been described. The method and apparatus of the invention allows for a multifunction peripheral port that does not rely upon an external peripheral selection switch. The apparatus accommodates for signal delays associated with the connection of a peripheral device, and then automatically recognizes a newly attached peripheral. The newly attached peripheral is configured on-line, without the need for rebooting the host computer. The invention allows a powered peripheral to be attached to a powered host computer.

The foregoing descriptions of specific embodiments of the present invention are presented for purposes of illustration and description. They are not intended to be exhaustive or to limit the invention to the precise forms disclosed, obviously many modifications and variations are possible in view of the above teachings. The embodiments were chosen and described in order to best explain the principles of the invention and its practical applications, to thereby enable others skilled in the art to best utilize the invention and various embodiments with various modifications as are suited to the particular use contemplated. It is intended that the scope of the invention be defined by the following Claims and their equivalents.

We claim:

1. Apparatus for automatically recognizing and operating cooperatively with a plurality of predefined different types of peripheral devices, said apparatus comprising:

a connector interface for transmitting and receiving peripheral device data signals to and from a peripheral device coupled thereto, and for receiving a plurality of peripheral identification signals from said peripheral device;

interface control circuits coupled to said connector interface;

a plurality of configuration registers coupled to said plurality of interface control circuits, said configuration registers storing values that govern operation of said interface control circuits;

a transition detector, coupled to said connector interface, for identifying a change in signal value in said plurality of peripheral identification signals, said change in signal value indicating connection or disconnection of a peripheral device to said connector interfacer said transition detector responding solely to said change in signal value;

an interface disable generator and signal delay compensator, activated by said transition detector, for temporarily applying a disable signal to said connector interface, said disable signal creating a disable state preventing said connector interface from transmitting and receiving said peripheral device data signals to and from any peripheral device coupled thereto for a period of at least 0.2 seconds;

a signal decoder, coupled to said connector interface, for identifying the type of peripheral device, if any, connected to said connector interface, based upon said plurality of peripheral identification signals; and means, coupled to said configuration registers and said transition detector, for loading configuration data into said configuration registers, in accordance with said identified peripheral device type during said disable state.

2. An apparatus for automatically recognizing and configuring itself to operate cooperatively with a peripheral device, said apparatus comprising:

a connector for receiving a first peripheral identification signal and a second peripheral identification signal, said first peripheral identification signal and said second peripheral identification signal being generated by a peripheral device coupled to said connector;

a connector interface coupled to said connector, said connector interface controlling the routing of peripheral device data signals generated by said peripheral device and received at said connector;

a plurality of interface circuits coupled to said connector interface;

a transition detector, coupled to said connector, for identifying a change in signal value in said first peripheral identification signal or said second peripheral identification signal, said change in signal value indicating a changed peripheral device connection at said connector, said transition detector responding solely to said change in signal value;

an interface disable generator, activated by said transition detector, for applying a disable signal to said connector interface for a predetermined period of time, said disable signal creating a disable state preventing said connector interface from routing data signals output by said peripheral device, said interface disable generator being coupled to said transition detector; and a signal decoder for identifying said peripheral device based upon said first peripheral identification signal and said second peripheral identification signal, during said disable state, said signal decoder being coupled to said connector interface and said transition detector.

3. The apparatus of claim 2, wherein said disable signal has a duration of at least 0.7 seconds:

further comprising:

a plurality of configuration registers coupled to said plurality of interface circuits;

means for loading configuration data into said configuration registers after said peripheral device is identified.

4. The apparatus of claim 2 wherein said connector interface is a multiplexer.

5. The apparatus of claim 2 wherein said plurality of interface circuits includes a parallel port circuit.

6. The apparatus of claim 2 wherein said plurality of interface circuits includes a SCSI circuit.

7. The apparatus of claim 2 wherein said plurality of interface circuits includes a floppy controller.

8. The apparatus of claim 2 further comprising a low pass filter positioned between said connector and said transition detector, said low pass filter providing a filter for high frequency signals produced when a connection is made at said connector.

9. The apparatus of claim 2, wherein said disable signal has a duration of at least 0.2 seconds.

10. A method for recognizing and configuring a cable-connected peripheral device, said method comprising the steps of:

receiving a plurality of peripheral identification signals from a peripheral device to be identified;

identifying a change in signal value in said plurality of peripheral identification signals upon connection or disconnection of said cable-connected peripheral device;

temporarily disabling receipt of peripheral data generated by said peripheral device and transmission of data to said peripheral device for a period of at least 0.2 seconds after said change in signal value is identified; and identifying, during said disabling step, said peripheral device based solely upon said changed value of said plurality of peripheral identification signals.

11. The method of claim 10 further comprising the step of:

enabling the receipt of peripheral data after said identifying step has identified said peripheral device.

12. The method of claim 10, wherein said disabling step disables receipt of peripheral data generated by said peripheral device and transmission of data to said peripheral device for a period of at least 0.2 seconds after said change in signal value is identified;

said method further comprising the step of:

loading configuration data into configuration registers after said peripheral device is identified; said configuration registers storing values that govern operation of circuits that interoperate with said peripheral device.

13. The method of claim 12, wherein said disabling step disables receipt of peripheral data generated by said peripheral device and transmission of data to said peripheral device for a period of at least 0.7 seconds after said change in signal value is identified.

14. The method of claim 10 further comprising the step of:

unloading a former driver program after said peripheral device is identified; and re-loading a new driver program after said peripheral device is identified.

* * * * *

UNITED STATES PATENT AND TRADEMARK OFFICE
CERTIFICATE OF CORRECTION

PATENT NO. : 5,548,782
DATED : August 20, 1996
INVENTOR(S) : Martin Stanley Michael, et. al.

It is certified that error appears in the above-identified patent and that said Letters Patent is hereby corrected as shown below:

In Col. 8, line 31, delete "interfacer" and replace with --interface,--.

Signed and Sealed this

Seventeenth Day of November, 1998

Attest:

BRUCE LEHMAN

Attesting Officer

Commissioner of Patents and Trademarks